US012579001B2

(12) United States Patent
de Araújo et al.

(10) Patent No.: US 12,579,001 B2
(45) Date of Patent: Mar. 17, 2026

(54) REINFORCEMENT LEARNING SPACE STATE PRUNING USING RESTRICTED BOLTZMANN MACHINES

(71) Applicant: Dell Products L.P., Round Rock, TX (US)

(72) Inventors: Micael Veríssimo de Araújo, Rio de Janeiro (BR); Yanexis Pupo Toledo, Niterói (BR); Eduardo Vera Sousa, Niterói (BR)

(73) Assignee: Dell Products L.P., Round Rock, TX (US)

( * ) Notice: Subject to any disclaimer, the term of this patent is extended or adjusted under 35 U.S.C. 154(b) by 526 days.

(21) Appl. No.: 18/152,575

(22) Filed: Jan. 10, 2023

(65) Prior Publication Data

US 2024/0231938 A1 Jul. 11, 2024

(51) Int. Cl.
*G06F 9/50* (2006.01)

(52) U.S. Cl.
CPC ............ *G06F 9/505* (2013.01); *G06F 9/5011* (2013.01)

(58) Field of Classification Search
None
See application file for complete search history.

(56) References Cited

U.S. PATENT DOCUMENTS

| | | | |
|---|---|---|---|
| 7,467,145 | B1 | 12/2008 | Castellanos et al. |
| 10,963,810 | B2 | 3/2021 | Dirac et al. |
| 11,574,243 | B1 | 2/2023 | Mallya Kasaragod |
| 2010/0242045 | A1 | 9/2010 | Swamy et al. |
| 2018/0260746 | A1 | 9/2018 | Xiong et al. |
| 2019/0266015 | A1 | 8/2019 | Chandra et al. |
| 2020/0090819 | A1 | 3/2020 | Durduran et al. |
| 2020/0241921 | A1 | 7/2020 | Calmon et al. |
| 2020/0257968 | A1 | 8/2020 | Mitra et al. |
| 2021/0058455 | A1 | 2/2021 | Kozhaya et al. |
| 2021/0092071 | A1 | 3/2021 | Tortosa et al. |
| 2022/0180275 | A1 | 6/2022 | Parizi et al. |
| 2023/0086563 | A1 | 3/2023 | Min et al. |
| 2023/0171340 | A1* | 6/2023 | Saravanan .............. G06F 1/324 455/566 |
| 2023/0334320 | A1 | 10/2023 | Zhang et al. |
| 2024/0012685 | A1 | 1/2024 | Sousa et al. |
| 2024/0015080 | A1 | 1/2024 | Illikkal et al. |
| 2024/0126605 | A1 | 4/2024 | Toledo et al. |
| 2024/0386054 | A1 | 11/2024 | Wouhaybi et al. |

OTHER PUBLICATIONS

Kalyan et al. ("Unsupervised Synaptic Pruning Strategies for Restricted Boltzmann Machines"; 2018 IEEE Biomedical Circuits and Systems Conference (BioCAS); Oct. 17-19, 2018).*
Ghojogh, Benyamin, et al. Restricted Boltzmann Machine and Deep Belief Network: Tutorial and Survey. arXiv preprint arXiv: 2107. 12521 (2021).

(Continued)

*Primary Examiner* — Eric C Wai
(74) *Attorney, Agent, or Firm* — Workman Nydegger

(57) ABSTRACT

Reinforcement learning with space state pruning is disclosed. States of an environment used in training a reinforcement learning model are pruned using a restricted Boltzmann Machine. Reducing the number of states, by pruning, reduces time to convergence.

20 Claims, 8 Drawing Sheets

(56) References Cited

OTHER PUBLICATIONS

Crawford, Daniel, et al. Reinforcement Learning using Quantum Boltzmann Machines. arXiv preprint arXiv:1612.05695, 2016.

Kullback, Solomon, and Richard A. Leibler. "On information and sufficiency." The annals of mathematical statistics 22.1 (1951): 79-86.

Gronauer, Sven; Diepold, Klaus. Multi-agent deep reinforcement learning: a survey. Artificial Intelligence Review, 2022, vol. 55, No. 2, p. 895-943.

Mignon, Alexandre dos Santos; Luis de Azevedo da Rocha, Ricardo, An adaptive implementation of e-greedy in reinforcement learning, Procedia Computer Science, 2017.

Mondal et al, "Scheduling of Time-Varying Workloads Using Reinforcement Learning", 2021, The Thirty-Fifth AAAI Conference on Artificial Intelligence (AAAI-21), pp. 9000-9008. (Year: 2021).

Tong et al, "Proactive scheduling in distributed computing—A reinforcement learning approach", 2014, J. Parallel Distrib. Comput. 74, pp. 2662-2672. (Year: 2014).

Berman H.B., "Probability Rules", archived at https://web.archive.org/web/20220625141414/https://stattrek.com/probability/probability-rules, Jun. 25, 2022. Accessed Dec. 1, 2025. (Year: 2022).

Zhang, X., Shae, Z. Y., Zheng, S., & Jamjoom, H. (2012, April). Virtual machine migration in an over-committed cloud. In 2012 IEEE Network Operations and Management Symposium (pp. 196-203). IEEE. (Year: 2012).

* cited by examiner

```
Inputs:
R: RL environment
F: similarity function
ε: similarity radius
RBM: trained RBM with observations Function prune_states(R, F, ε):
1   obs = R.get_observations() // get observations from environment
2   P = RBM(obs) // compute the probabilities of all states given
                 // a set of observations
3   for idx, i, j in enumerate(zip(P, P)):
4       if F(i, j) < ε:
5           if i > j: remove (j) else: remove(i)
6           adjust_action_space()
```

Obtain Observations From
Environment
502

Determine Probabilities for Each
State
504

Prune States
506

500

$P(s_1 | o_1, o_2, ..., o_n) = 0.89$ $P(s_2 | o_1, o_2, ..., o_n) = 0.887$ $P(s_3 | o_1, o_2, ..., o_n) = 0.4$ $P(s_4 | o_1, o_2, ..., o_n) = 0.2$

600

602

700

Memory
702

NVRAM
704

Processor
706

Application(s)
714

Storage Media
708

UI Device
710

Data Storage
712

REINFORCEMENT LEARNING SPACE STATE PRUNING USING RESTRICTED BOLTZMANN MACHINES

FIELD OF THE INVENTION

Embodiments of the present invention generally relate to placing workloads in a computing environment. More particularly, at least some embodiments of the invention relate to systems, hardware, software, computer-readable media, and methods for using infrastructure to efficiently execute workloads while respecting service level agreements (SLAs) and ensuring quality of service (Qos). Embodiments of the invention further relate to training reinforcement learning models by pruning states.

BACKGROUND

Cloud computing has several advantages, which include pay-per-use computation from the customer's perspective and resource sharing from the provider's perspective. Using virtualization, it is possible to abstract a pool of computing infrastructure to offer computing resources to users (e.g., consumers, applications, customers) that are tailored to the needs of the users. Using various abstractions such as containers and virtual machines, it is possible to offer computing services without the user knowing what infrastructure is executing the user's code or application. These services may include Platform as a Service (PaaS) and Function as a Service (FaaS) paradigms.

In these paradigms, the QoS expected by the user may be expressed through SLAs, which may reflect expectations such as response time, execution time, uptime percentage, and/or other metrics. Providers try to ensure that they comply with the SLAs in order to avoid contractual fines and to preserve their reputation as an infrastructure provider.

Providers may take different approaches to ensure they comply with their contractual agreements (e.g., SLAs). For example, a provider may dedicate a static amount of resources to each user/workload. However, it is problematic to assume that a workload is bounded by one particular resource. Some workloads may have an IO (Input/Output) intensive phase followed by a compute-intensive phase. Dedicating some amount of static resources to a workload may result in inefficiencies and idle resources. Further, it is possible that the initial allocation of resources may be under-estimated.

Allocating excessive resources may also adversely impact the provider. From the perspective of a single workload, the provider may perform the workload and easily comply with the relevant SLAs. However, when the provider allocates excessive resources to the single workload, the number of users that can be served by the provider is effectively reduced because the number of spare resources dictates how many workloads can be performed in parallel while still respecting the SLAs. As a result, allocating excessive resources to a single workload impacts the overall efficiency and may limit the number of workloads the provider can accommodate.

While SLAs are often determined in advance of performing a workload, the execution environment is more dynamic. New workloads may compete for computing resources, and this may lead to unplanned demand, which may disrupt the original workload planning because of a greater need to share resources, workload priorities, and overhead associated with context switching.

Additional challenges facing providers include providing services to their users in a manner that respects SLAs while minimizing resource usage. Stated differently, providers are faced with the challenge of efficiently using their resources to maximize the number of users/workloads.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 discloses aspects of pseudocode for pruning states in Q-learning related operations;

DETAILED DESCRIPTION OF SOME EXAMPLE EMBODIMENTS

Figure 1A:
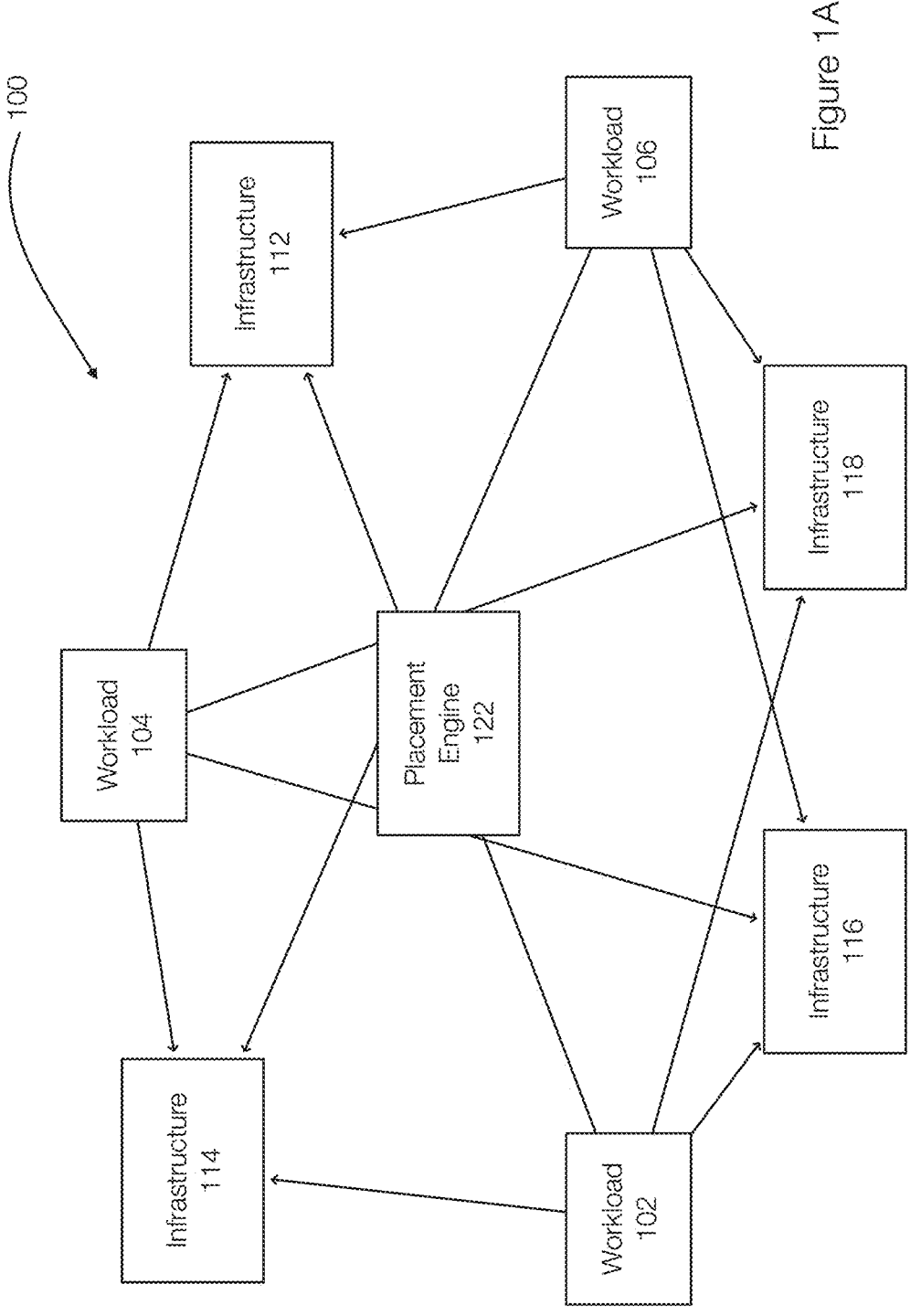
FIG. 1A discloses aspects of allocating or placing workloads in an environment.

Embodiments of the present invention generally relate to workload placement and resource allocation. More particularly, at least some embodiments of the invention relate to systems, hardware, software, computer-readable media, and methods for allocating resources using multi-agent reinforcement learning-based systems or pipelines. Example embodiments of the invention further relate to executing workloads while respecting service level agreements (SLAs) and ensuring quality of service (QOS). Example embodiments of the invention further relate to training machine learning models such as multi-agent reinforcement learning models to place workloads.

Workloads may be placed using a machine learning model such as a reinforcement learning model. Generally, reinforcement learning is a training method that rewards desired behaviors. Undesired behaviors are punished (lower reward) or are not rewarded. The reinforcement learning model learns to place workloads in a manner the improves or maximizes rewards. Once the model is trained, workloads can be placed in a computing environment. Examples of placing include allocating resources (an initial assignment to a device), leaving a workload in place, and/or migrating a workload to a new location.

When placing workloads, one goal of an infrastructure provider is to ensure that executing the workload complies with relevant SLAs. Although SLAs are typically set or determined before a workload is executed, the execution of the workload is subject to various issues that may impact the ability of the provider to meet the requirements of the SLAs. Examples of such issues include inadequate knowledge about actual resource requirements, unexpected demand peaks, hardware malfunctions, or the like.

Workloads may have different bottlenecks. Some workloads may be compute-intensive while other workloads may be IO (Input/Output) intensive. Some workloads may have different resource requirements at different points of their executions. As a result, some workloads can be executed more efficiently in certain resource environments and it may be beneficial, at times, to migrate a workload to a new or different computing environment. For example, the execution environment of a workload during a compute-intensive phase of the workload may be inadequate for an IO intensive phase of the same workload.

Before placing workloads, a machine learning model may be trained. The model may be trained, for example, using reinforcement learning. Reinforcement learning is a machine learning process that splits a main problem into states and provides a reward to an agent (e.g., a workload) or a set of agents as the agent or agents move from one state to another state. One method used to train a reinforcement learning model is a Q-learning method. In Q-learning, a Q-table (a table) is iteratively updated to map the environment observations into actions while keeping track of the reward obtained by each possible action.

One of the concerns that that may exist in Q-learning scenarios relates to the number of states that may exist. In the context of placing workloads, for example, a computing system or environment may include multiple infrastructures (or a single infrastructure) that each have multiple devices (e.g., physical machines, virtual machines, containers) with varying resources (e.g., number of cores, available RAM (Random-Access Memory), number of GPUs (Graphics Processing Unit)). When there are many devices in the system, which may be geographically distributed, there are a large number of states.

Many of the states, however, may be similar in terms of rewards. When there is a large number of states and actions to map, this becomes a combinatorial problem with high computational cost and long training times. This may make using reinforcement learning unfeasible and may consume excessive resources.

Example embodiments of the invention more specifically relate to training machine learning models including reinforcement learning models that may be configured to perform or recommend workload placement in a computing system or environment. Example embodiments of the invention further relate to pruning states in machine learning model training operations.

Pruning states advantageously reduces the computational costs and training times. In some examples, a Boltzmann Machine (BM) or a Restricted Boltzmann Machine (RBM) is used in a learning architecture or system, such as a multi-agent reinforcement learning (MARL) architecture or system. Using an RBM to prune states allows the time and/or steps needed for model convergence to be reduced.

For conveniences, a brief explanation for RBMs and probabilities is provided. RBMs are considered to be energy-based models, so their probability distribution is defined by an energy function $$E(x): p(x) = \frac{1}{Z} e^{-E(x)},$$

where Z is a normalize factor defined by:

$$Z = \sum_i e^{-E(x_i)}.$$

For an RBM specifically, the energy function can be derived by using the hidden and visible units:

$$E(v, h) = -\sum_{i \in \Lambda} a_i v_i - \sum_{j \in \Pi} b_j h_j - \sum_{i \in \Lambda} v_i h_j W_{ij},$$

where $\Lambda$ is the set of index for visible variables and $\Pi$ is the set of index for the hidden units.

The probability for a pair of visible and hidden unit is:

$$p(v, h) = \frac{1}{Z} e^{-E(v,h)}.$$

The partition function Z is:

$$Z = \sum_{v,h} e^{-E(v,h)}.$$

The probability for a visible unit is taken by summing over all the neighbors in hidden unit:

$$p(v) = \frac{1}{Z} \sum_h e^{-E(v,h)}.$$

More specifically, the RBM is trained using fingerprints of states, which are described in more detail below. These fingerprints of states are used to assess the similarity between states. Redundant or sufficiently similar states are pruned during the training operations or more specifically when updating the Q-table.

Stated differently, pruning states may include creating or generating a superstate that encompasses or represents a set of sufficiently similar states. Combining states reduces the number of states and is an example of pruning. Combining states may include evaluating a pair of states and pruning or removing one of the states when the states are sufficiently similar. Thus, pruning states reduces the update requirements associated with a Q-table. This reduces the computational cost of training a reinforcement learning machine or a reinforcement learning policy.

FIG. 1A discloses aspects of placing workloads in a computing system. FIG. 1A illustrates a computing environment or system 100 that includes various computing infrastructure 112, 114, 116, and 118. The infrastructure 112, 114, 116, and 118 may be distributed or in different locations around the world. The infrastructure 112, 114, 116, and 118 may represent edge systems, datacenters, or the like or combinations thereof. The infrastructure 112, 114, 116, and 118 may alternatively be different portions of the same infrastructure. Embodiments of the invention may also be applied to a single infrastructure. A computing system in which workloads are placed generally includes computing infrastructure (processors, memory, GPU, networking hardware, switches, etc.) that may or may not be in different locations.

For example, each of the infrastructure 112, 114, 116, and 118 may be configured to include multiple devices (containers, virtual machines, etc.) configured to execute workloads, represented by workloads 102, 104, and 106.

Workloads are placed in the system 100 by a placement engine 122, which may include or represent a trained reinforcement learning model or other machine learning model. The placement engine 122 may be configured to place the workloads 102, 104, and 106 in the infrastructure 112, 114, 116, and 118. The placement engine 122 may be configured to ensure that the infrastructure 112, 114, 116, and 118 comply with relevant SLAs by placing workloads. As previously stated, placing may include allocating resources, leaving a workload at its present location, migrating a workload to a new location, or the like.

More specifically, given a workload $W_i$, the tasks performed by the placement engine 122 relate to assigning a suitable infrastructure $S_i$ to run $W_i$ while respecting a certain SLA considering network lag, response time, execution time, and/or the like.

The placement engine 122, when trained, can make placement decisions (e.g., migrate workloads, keep workloads in current locations). Embodiments of the invention relate to training the placement engine 122 (i.e., the reinforcement learning model) and further relate to training the placement engine 122 using fewer states.

Further detail about using a reinforcement learning model to allocate resources to workloads is disclosed in U.S. patent application Ser. No. 17/811,693 entitled SWARM MULTI-AGENT REINFORCEMENT LEARNING-BASED PIPE-LINE FOR WORKLOAD PLACEMENT and filed Jul. 11, 2022, which is incorporated herein by reference in its entirety. U.S. patent application Ser. No. 18/047,459 filed Oct. 18, 2022, is also incorporated by reference in its entirety.

Figure 1B:
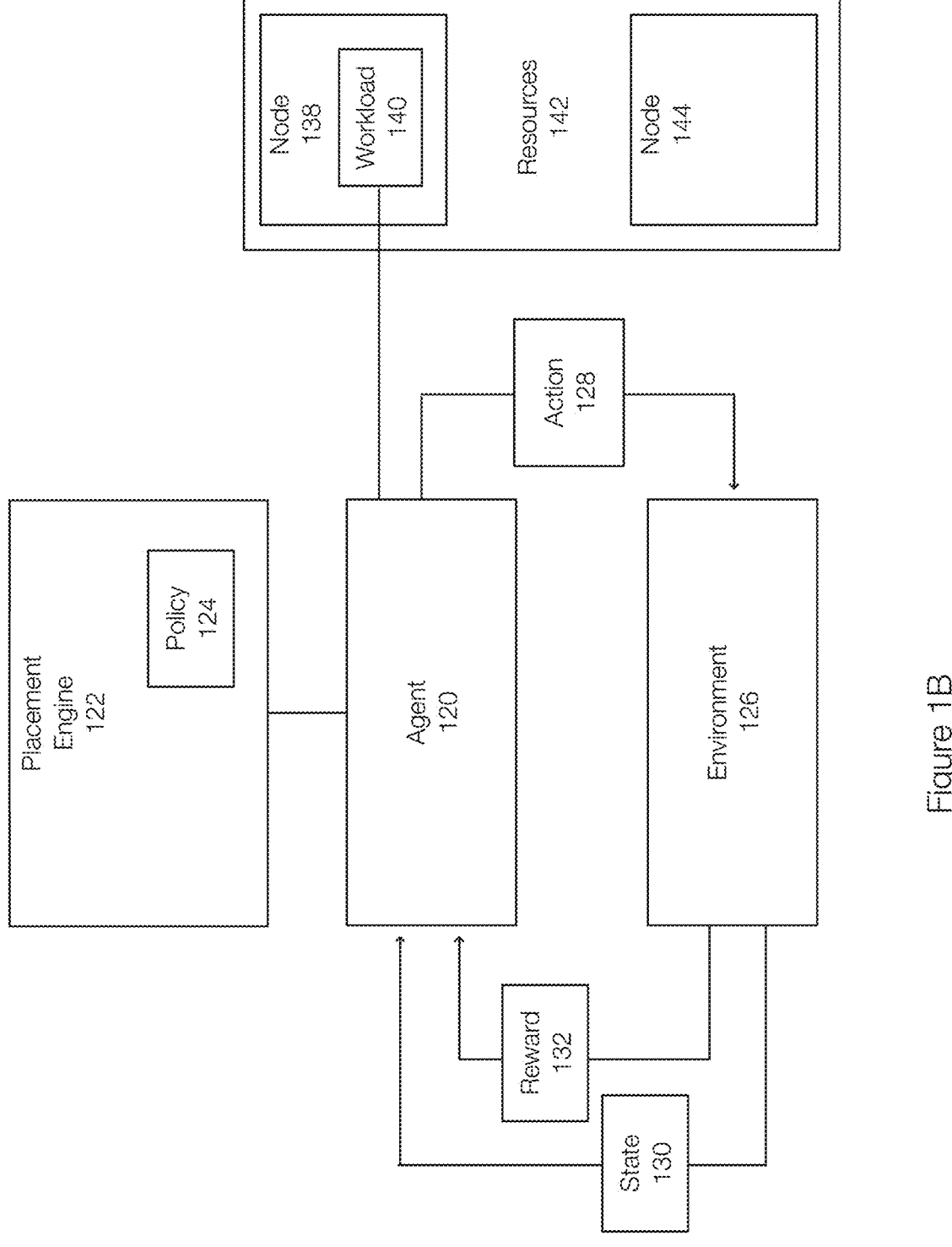
FIG. 1B discloses aspects of a reinforcement learning (RL) model.

FIG. 1B discloses aspects of a reinforcement learning model configured to place workloads. In FIG. 1B, an agent 120 may be associated with a workload 140 (the agent 120 and the workload 140 may be the same or integrated) being executed at a node 138, which may be implemented as a virtual machine and which may be part of computing resources 142 available to be used by the reinforcement learning model. The computing resources 142, which is an example of the infrastructures 112, 114, 116, and/or 118, may include computing resources such as processors, GPUs, CPUs, memory, network hardware, and the like. Containers, virtual machines, and the like may be created on the computing resources 142. The workloads are performed or executed by the virtual machines, containers, or other compute (nodes).

The agent 120 may perform an action 128 (e.g., a placement action identified or recommended by the placement engine 122) with regard to the workload 140. The action 128 may include leaving the workload 140 at the node 138 or moving/migrating the workload 140 to another node, such as the node 144.

The action 128 is thus executed in the environment, which includes the computing resources 142 or more specifically the nodes 138 and 144. After execution or during execution of the workload 140, the state 130 and/or a reward 132 may be determined and returned to the agent 120 and/or to the placement engine 122.

In one example embodiment, the reward 132 may be a value that represents the execution of the workload 140 relative to an SLA or an SLA metric. For example, the reward 132 may represent a relationship between the response time or system latency of the workload and the response time or system latency specified in the SLA.

The state 130 of the environment (e.g., the resources 142) or of each node and the reward 132 are input into a placement engine 122, directly or by the agent 120 as illustrated in FIG. 1B. The state 130 may include the state (e.g., processors, cores, available memory, total memory, GPUs) of each node (e.g., each virtual machine, container, physical machine) included in the resources 142. This information can be represented in a one hot encoding style. In this example, the reward 132 reflects the actual performance at the virtual machine of the node 138 of the workload 140. If using response time as a metric, the reward 132 reflects the relationship between the actual response time and the SLA response time.

The placement engine 122 may generate a new recommended action for the agent 120 to perform for the workload 140. This allows the agent 120 to continually adapt to changes (e.g., SLA compliance/non-compliance) at the computing resources 142 and perform placement actions that are best for the workload 140 and/or for the provider to comply with SLA requirements, efficiently use the resources 142, or the like.

The placement engine 122 may also have a policy 124 that may impact the placement recommendations. The policy, for example, may be to place workloads using a minimum number of virtual machines, to perform load balancing across all virtual machines, or to place workloads using reinforced learning. These policies can be modified or combined. For example, the policy may be to place workloads using reinforced learning with some emphasis towards using a minimum number of virtual machines or with emphasis toward load balancing. Other policies may be implemented.

The output of the placement engine 122, may depend on how many actions are available or defined. If a first action is to keep the workload where the workload is currently operating and the second action is to move the workload to a different node, the output of the placement engine may include two anticipated rewards. One of the rewards corresponds to performing the first action and the other reward corresponds to performing the second action. The action selected by the agent 120 will likely be the action that is expected to give the highest reward. Multiple agents (workloads), represented by the agent 120, may use the same placement engine 122.

In one example, an expected reward may be generated for migrating the workload to a node that is geographically closest to the workload 140 so as minimize system response time.

The placement engine 122, prior to use, may be trained. When training the placement engine 122, workloads may be moved randomly within the resources 142. At each node, a reward as generated. These rewards, along with the states of the nodes, can be used to train the placement engine 122. Over time, the placement becomes less random and begins to rely on the output of the placement engine 122 until training is complete.

Thus, the placement engine 122, by receiving the reward 132 and state 130 during training, which may include multiple migrations of the workload to the nodes of the resources 142, some of which may be random, can implement reinforcement learning.

Embodiments of the invention may include deep learning reinforcement learning. More specifically, the placement engine 122 may include a neural network that implements reinforcement learning models to allow one or more experiences of the agents, along with random migrations to different resource allocations for performing the workload 140, to train the placement engine 122.

In other words, during the training process for the placement engine 122, the agents perform actions action by moving the workloads to different nodes in the computing resources 142 such as the nodes 138 and 144. Each of the placements of the workloads into a different node for execution is considered an "experience" and analysis of the placement actions and the corresponding rewards are used to train the placement engine 122. The experiences may be chosen randomly so that all (or at least a significant portion) of the different combinations of workload-node associations can be analyzed to find the best workload-node association that is geographically closest to the workloads so as to minimize system response time.

As will be appreciated, it may take a large number of experiences to train the placement engine 122 due to the numerous different combinations of workload-node associations. Many of the experiences will generate a low reward in the reinforcement learning model and thus in operation the workload 140 will never be placed in a node having the computing resources that cause a low reward. In contrast, many experiences will generate a high reward and in operation could be considered for having the workload 140 executed at the node having the computing resources that cause the high reward. For example, if in a first experience a workload is placed at a node that implements a virtual machine and other computing resources that are a long distance from the where the workload is located, the response time or system latency may be higher than the SLA constraints and so a low reward would be generated. However, if in a second and third experience the workload is placed at nodes that implement a virtual machine and other computing resources that are a close distance from the where the workload is located (or at least closer than the virtual machine and other computing resources of the first experience), the response time or system latency may be within the SLA constraints and so a high reward would be generated for both the second and third experiences.

In the MARL method, the workload allocation training process may occur in an environment that includes multiple nodes with different resources (GPUs, number of cores, etc.) and multiple workloads to be executed as previously stated. Training the reinforcement learning model is performed to define an association between workload and node in a manner to comply with SLA requirements.

During the training process, the agents (workloads) take an action (they are placed to the nodes), where each node (e.g., a device, a container, a virtual machine) is or corresponds to a state of the environment. Each action receives a reward that depends on the response time in each state. Observations on these actions include allocation information for each workload. This training cycle corresponds to an experience (placement of workloads into nodes, i.e., orchestration).

To train the reinforcement learning model, a large number of possible states are tested, generated, or evaluated due to the combinations between workload-nodes associations, but with similar rewards. Embodiments of the invention determine whether a state is similar to another state and, a priori, perform a pruning operation. The pruning operation may only keep one of the two states or keep one of multiple states. This pruning operation may also be referred to as creating a superstate. Pruning states during training operations saves time and efficiently uses computational resources at least because the space of states is reduced.

Figure 1C:
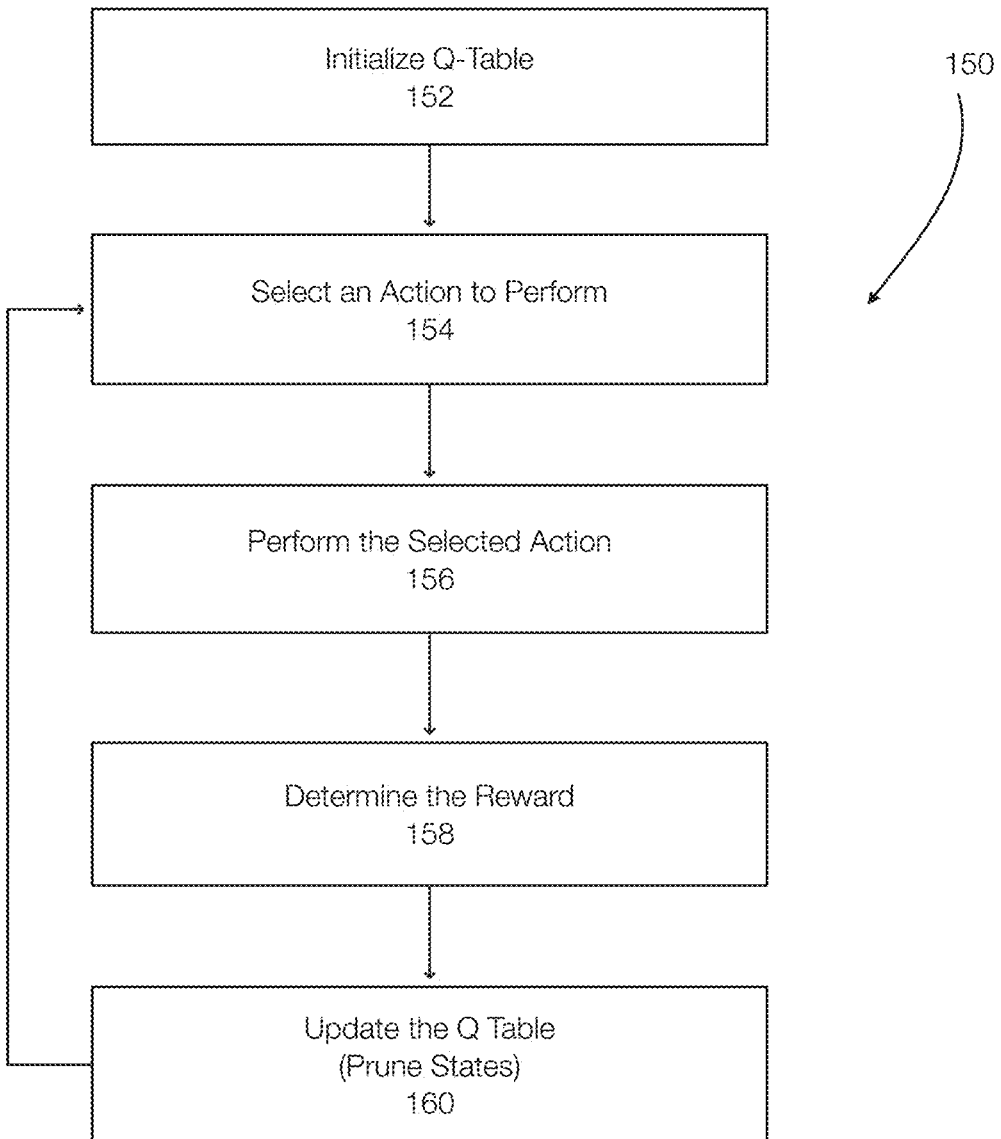
FIG. 1C discloses aspects of reinforcement learning that includes state pruning.

FIG. 1C discloses aspects of training a model such as a reinforcement learning model. In one example, a Q-table or table is initialized 152 in the method 150. A Q-table is or is similar to a lookup table that may identify the expected future rewards for an action at each state. Once the Q-table is ready, the method 150 may use the Q-table select 154 an action to perform. The selected action is performed 156 and the reward is determined 158. Once the reward is determined 158, the Q-table is updated 160. In embodiments of the invention, updating the Q-table includes pruning the states. In one example, the states are pruned to reduce the number of states to be processed during training operations.

Updating the Q-table may include performing a Q-function, such as a Bellman equation. In one example, a Q-table may include m rows and n columns (m×n). However, other configurations are possible. In this example, m is the number of states and n is the number of actions. More generally, the Q-table may map or associate states, actions, and/or rewards. As previously stated, the Q-table may be large and updating the Q-table may require substantial time and computing resources. Thus, embodiments of the invention prune the states to reduce the time and resources required to update the Q-table. This allows the model being trained to converge more quickly.

Figure 2:
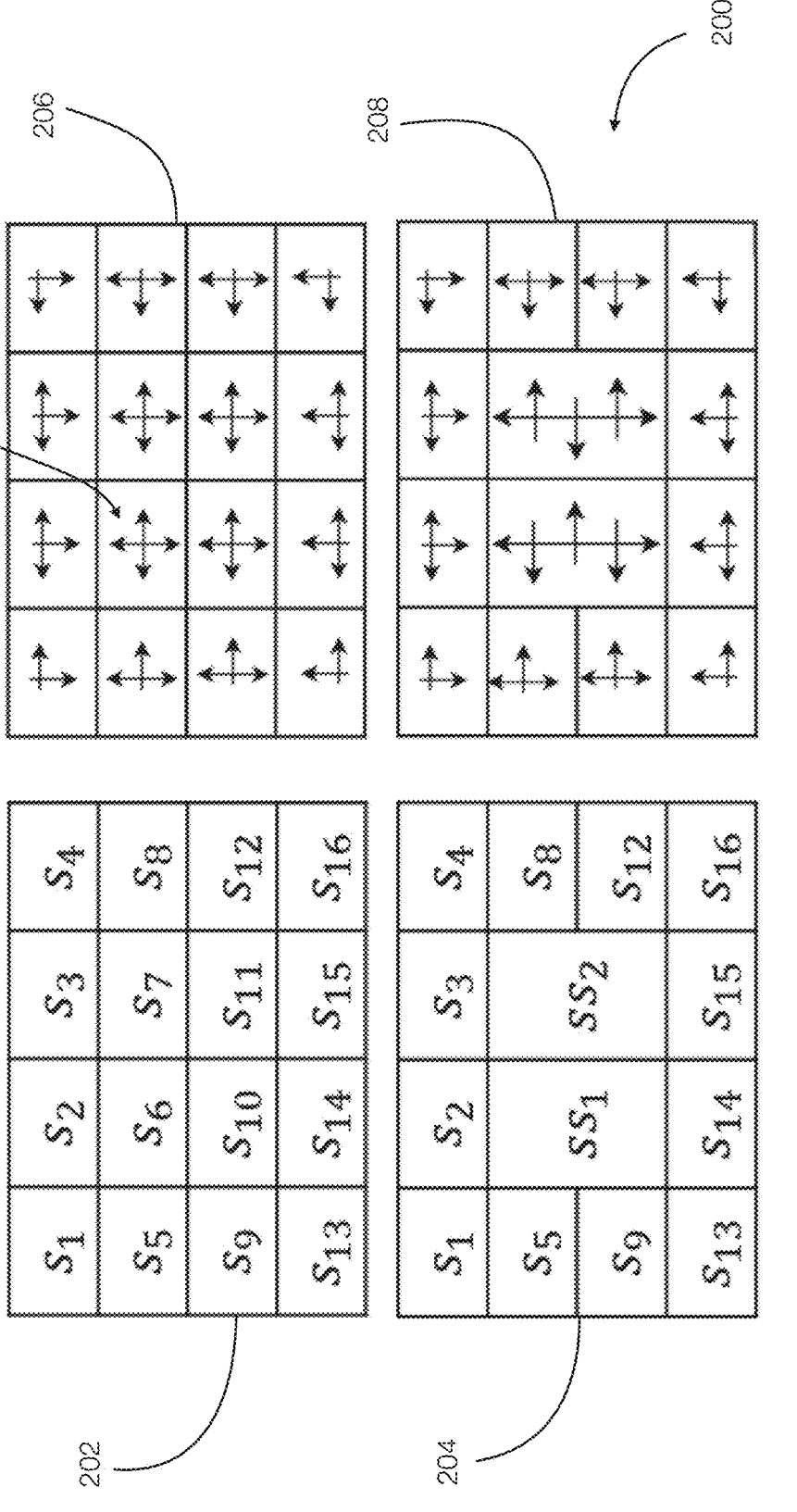
FIG. 2 discloses aspects of a Q-table.

FIG. 2 discloses aspects of a Q-table and discloses aspects of pruning a Q-table. The Q-table 200 is represented to illustrate both states and associated actions. The Q-table 200 may also include rewards. The table 202 includes states 202 and the table 206 illustrates the corresponding actions/rewards. These tables are illustrated separately for convenience. As illustrated, each state in the table 202 corresponds to potential actions in the table 206. Thus, actions for state $s_6$ correspond to actions 210.

When pruning states, an RBM may be used to determine the probability of a given state. These probabilities can be evaluated or compared. When states are similar, the similar states can be pruned. For example, two different states may be reduced to a single state by removing one of the states. As illustrated in FIG. 2, the tables 204 and 208 represent the states and actions after pruning has been performed. In this example, the states $s_6$ and $s_{10}$ are determined to be sufficiently similar and are combined (e.g., one is pruned) into a superstate $ss_1$. Similarly, the states $s_7s_{11}$ have been combined into a superstate $ss_2$. The actions are similarly combined as needed. This allows states to be clustered into superstates.

Pruning states (creating superstates) can be achieved by identifying states that are associated with similar rewards or by identifying states associated with similar probabilities. Pruning, in one example, may be performed using non-supervised learning operations or methods such as an RBM. The RBM can be trained to model the probability of achieving a state in a Markovian process, such as a reinforcement learning based method. As a result, an RBM can be used to provide a Q-function approximation in a deep Q-reinforcement learning. In one example, an RBM differs from a BM by removing connections between nodes in the same layer. This makes the probability obtained by the nodes independent from each other and the only dependence comes from the input. Because an RBM is non-supervised, dataset annotations are not required. An RBM can encode the probability of transitions between states.

Figure 3:
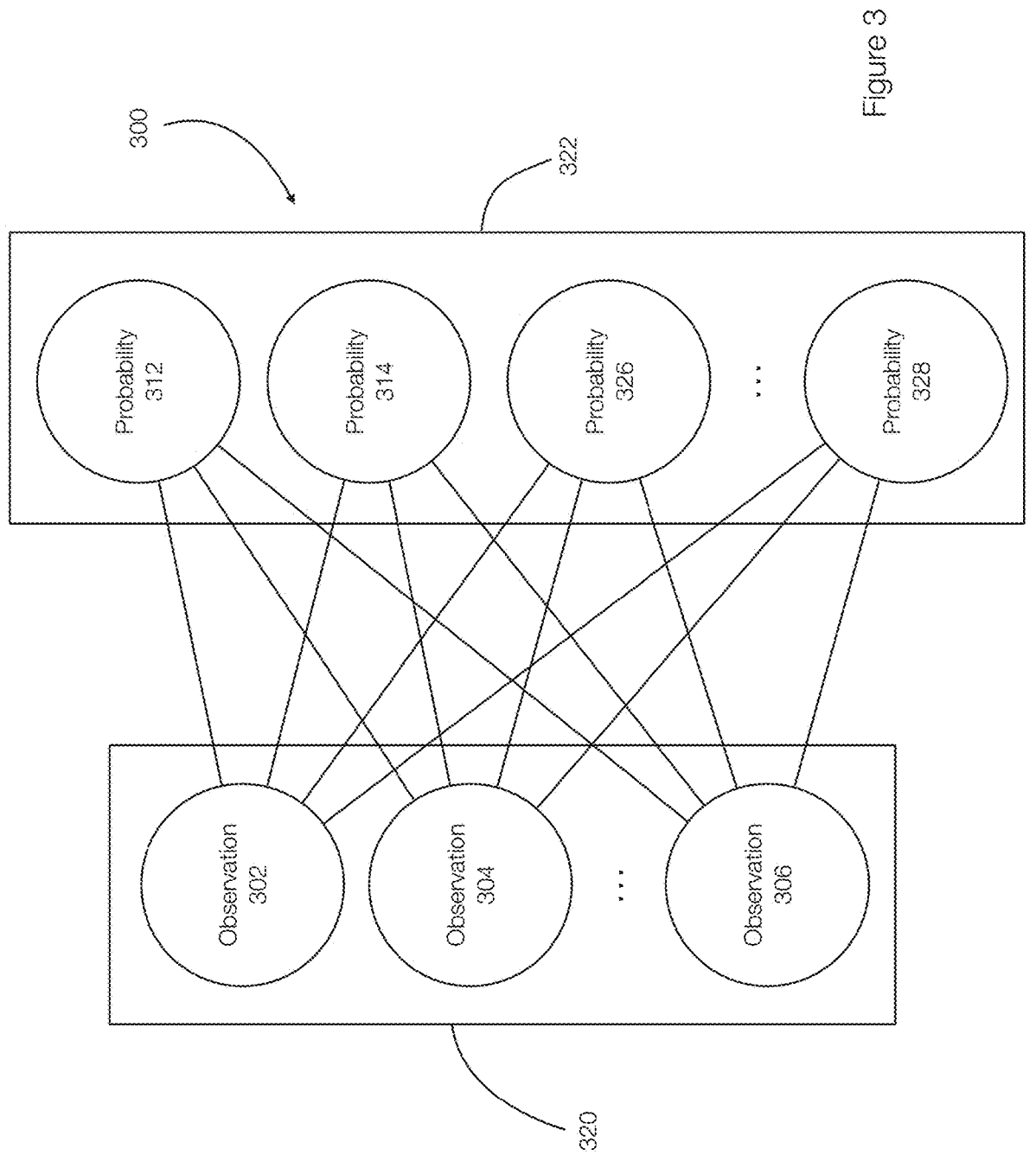
FIG. 3 discloses aspects of a Restricted Boltzmann Machine (RBM) model.

FIG. 3 discloses aspects of pruning that includes using a model such as an RBM. The model 300, which may be an RBM, includes inputs 320 and a hidden layer 322. In this example, an environment may include m devices, which may represent or correspond to m states. An RBM may include m nodes in the hidden layer 322. This allows the m states in a Q table, such as the Q table 200, to be matched by the m nodes of the RBM. In one example, the state $s_i$ in the Q table is mapped to the node $n_i$ in the RBM.

In this example, the inputs 320 may include observations from a computing system with m possible states (e.g., m devices or nodes). In this example, the observations $O=\{o_i | i=1, \ldots, n\}$ are obtained from the environment (e.g., the environment 100). The observations may include data or metadata such as network latency, GPU available, number of cores, response time, or the like and may be represented as a one hot encoding. These observations are the inputs or features input to the model 300 and are represented by observations 203, 204, and 206.

After the RBM is trained, for example using historical observations, and because the state $s_i$ in the Q table is mapped to the node $n_i$ in the RBM, the following mapping applies:

$$p(s_i) = P(n_i \mid o_i, \ldots, o_n). \tag{1}$$

In this example, $p(s_i) = P(n_i | o_i, \ldots, o_n)$ is the output of the node $n_i$ of the RBM.

The equation (1) is a fingerprint to the available states in a Q-table. In other words, each of the probabilities 312, 314, 326, and 328 are a state fingerprint. These fingerprints can be compared using a similarity measurement, such as the Kullback-Leibler divergence or other functions or thresholds in order to determine which states are similar. By identifying similar states and then pruning some of the similar states (e.g., creating superstates), compute resources are conserved and computation time is reduced when updating the Q-table.

In one example, the similarity level between states can be defined as a parameter (e.g., $\epsilon$—similarity radius). If two states differ by less than E, the states are similar and one of the two states can be pruned. This may be determined by a similarity function that is defined as follows:

$$F(p(s_i), p(s_j)) < \epsilon \Rightarrow s_i = s_j. \tag{2}$$

The value of E may be user defined. In one example, e may be 0.05. Other values, greater or lower, may also be used.

In practical terms, by finding similar states, the policy learning of both states can be avoided and the size of the space state can be reduced, which improves the performance of Q-learning based methods. This pruning process results in the state space in the table 204 previously described.

During the training phase of the Q-Learning and by using equation (2), states that are similar can be pruned and the resulting state space is smaller. This is useful, by way of example, when the optimization space state has a larger number of possible states that do not have great gain in terms of rewards and they only make the optimization process slower in terms of time.

During the training of the reinforcement learning model, many states are evaluated. When states are similar, the rewards or expected rewards may not differ significantly. Thus, these states can be pruned because the same reward is received or expected.

FIG. 4 discloses aspects of pseudocode for pruning a state space. The pseudocode 400 is an example of pruning states. In one example pruning compares two states and the state with a higher probability is retained. The pseudocode can process the states to reduce the number of states to be processed.

Figure 5:
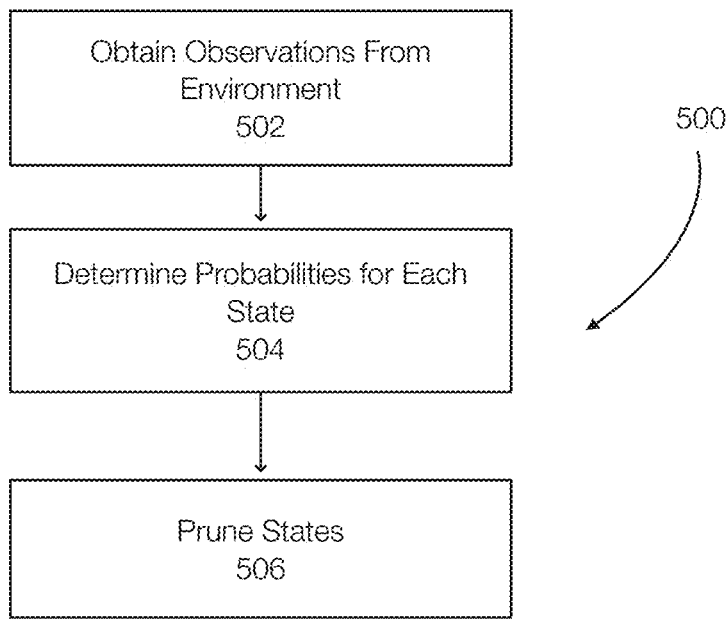
FIG. 5 discloses aspects of pruning states.

FIG. 5 discloses aspects of pruning states. The method 500 may assume that the set of states is defined and available. The method 500 includes obtaining 502 observations from the system. The observations may include data from each of the nodes (devices) in the environment. The observations may be organized as a one hot encoding. The observations are input into the RBM such that probabilities are determined 504 for each state.

Once the probabilities are determined, the states are pruned 506. In one example, pruning the states includes examining the states in pairwise manner and when a pair of states satisfy the similarity function, one of the states is pruned.

Figure 6:
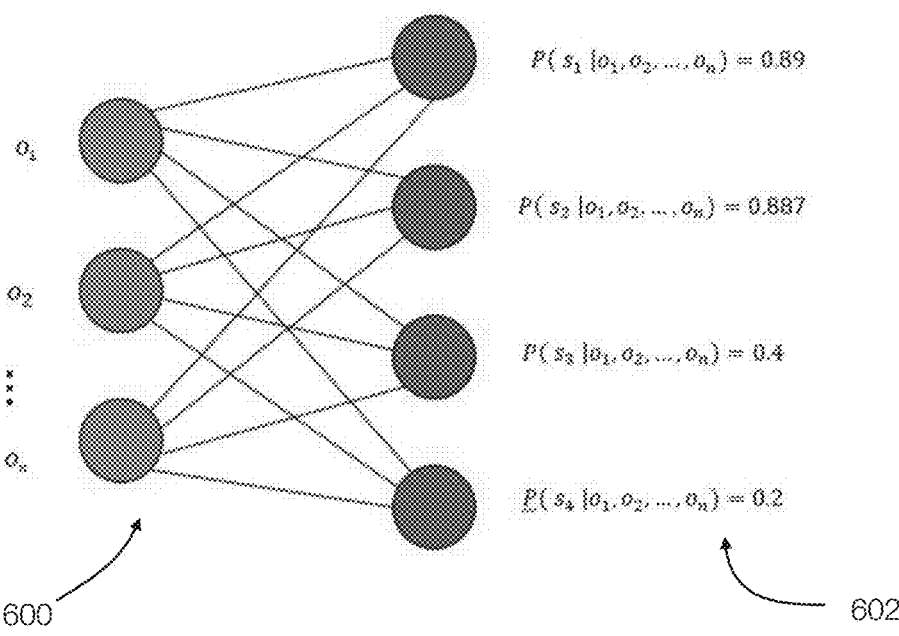
FIG. 6 discloses aspects of pruning states based on probabilities.

FIG. 6 discloses aspects of determining probabilities and pruning states. The RBM 600 receives observations as input (e.g., observations from each node in the computing system). The probabilities 602 generated in the RBM are illustrated for each state. If the similarity radius E is 0.05, comparing $s_1$ and $s_2$ have probabilities whose difference is less than 0.05. As such, the state with the higher probability $(s_1)$ in FIG. 6 is kept and the state $s_2$ is pruned. Stated differently, these states ($s_1$ and $s_2$) may be represented as a superstate. Thus, the number of states for optimization is reduced.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data functionality for one or more clients. Another example of a cloud computing environment is one in which processing, data related operations, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices (nodes) in the operating environment may take the form of software, physical machines, containers, or VMs, or any combination of these, though no particular device implementation or configuration is required for any embodiment. Similarly, data system components such as databases, storage servers, storage volumes (LUNs), storage disks, replication services, backup servers, restore servers, backup clients, and restore clients, for example, may likewise take the form of software, physical machines or VMs, though no particular component implementation is required for any embodiment.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: obtaining observations from nodes operating in a computing system, wherein each of the nodes corresponds to a state, determining probabilities for each of the states, and pruning first states in the states that are sufficiently similar to second states in the states.

Embodiment 2. The method of embodiment 1, further comprising determining the probabilities for each of the states with a restricted Boltzmann machine.

Embodiment 3. The method of embodiment 1 and/or 2, wherein the nodes include virtual machines, containers, and/or physical machines, wherein the observations include metadata for each of the devices.

Embodiment 4. The method of embodiment 1, 2, and/or 3, wherein the metadata includes processing cores, network lag, GPU resources, response time, and/or available memory.

Embodiment 5. The method of embodiment 1, 2, 3, and/or 4, wherein pruning states includes comparing the states in a pairwise fashion based on corresponding probabilities, wherein for each pair of states, one of the states is removed when a similarity function is less than a threshold value.

Embodiment 6. The method of embodiment 1, 2, 3, 4, and/or 5, wherein the threshold value is 0.05.

Embodiment 7. The method of embodiment 1, 2, 3, 4, 5, and/or 6, further comprising defining a set of the states.

Embodiment 8. The method of embodiment 1, 2, 3, 4, 5, 6, and/or 7, wherein the states are included in a Q-table and are associated with actions and/or rewards.

Embodiment 9. The method of embodiment 1, 2, 3, 4, 5, 6, 7, and/or 8, further comprising training a model based on states remaining after pruning.

Embodiment 10. The method of embodiment 1, 2, 3, 4, 5, 6, 7, 8, and/or 9, further comprising placing workloads in the system after a placement model is trained.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, engine, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
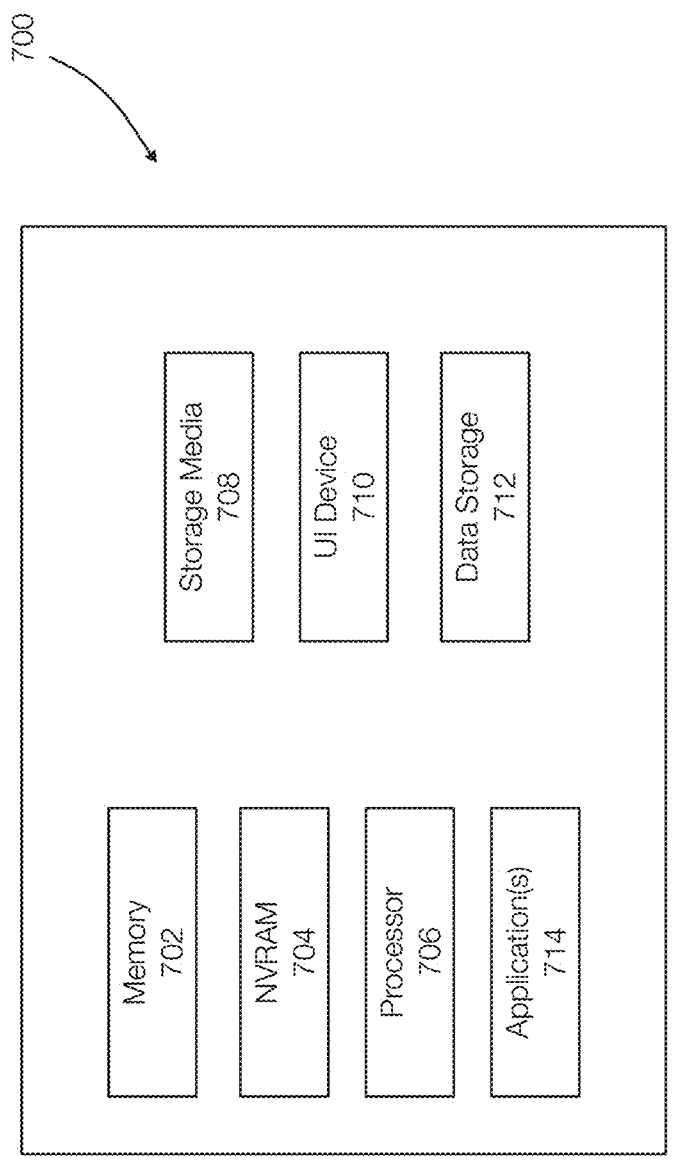
FIG. 7 discloses aspects of a computing device, system, or entity.

With reference briefly now to FIG. 7, any one or more of the entities disclosed, or implied, by the Figures and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 7.

In the example of FIG. 7, the physical computing device 700 includes a memory 702 which may include one, some, or all, of random-access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid-state device (SSD) storage. As well, one or more applications 714 may be provided that comprise instructions executable by one or more hardware processors 706 to perform any of the operations, or portions thereof, disclosed herein. The device 700 may alternatively represent a computing system that may be geographically distributed, a datacenter, or other infrastructure.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

obtaining performance observations from nodes operating in a computing system, wherein each of the nodes corresponds to a state in a reinforcement learning training environment;

determining, by a restricted Boltzmann machine (RBM), probabilities for each of the states based on the performance observations representing network latency, GCU utilization, and available memory; and pruning the states during Q-table update operations by creating a superstate that represents first states in the states that are sufficiently similar to second states in the states based on a similarity radius (E) defined by a similarity function, wherein pruning reduces the dimensionality of the Q-table used to train a workload placement model.

2. The method of claim 1, wherein the restricted Boltzmann machine includes a hidden layer having nodes respectively corresponding to the states, the probabilities for the states being output from the hidden layer nodes.

3. The method of claim 1, wherein the nodes include virtual machines, containers, and/or physical machines, wherein the observations include metadata for each of the devices.

4. The method of claim 3, wherein the metadata includes processing cores, network lag, GPU resources, response time, and/or available memory.

5. The method of claim 1, wherein pruning states includes comparing the states in a pairwise fashion based on corresponding probabilities computed by the RBM during reinforcement learning training, wherein for each pair of states, one of the states is combined into a superstate and removed from the Q-table when a similarity function $f(s_i, s_j)$ is less than a threshold value defined by the similarity radius ($\epsilon$).

6. The method of claim 5, wherein the threshold value is 0.05.

7. The method of claim 1, further comprising defining a set of the states.

8. The method of claim 7, wherein the states are included in a Q-table and are associated with actions and/or rewards.

9. The method of claim 8, further comprising training a reinforcement learning placement model based on the reduced Q-table containing only non-pruned states remaining after pruning, wherein the model is configured to place workloads among nodes to maintain compliance with service level agreement (SLA) parameters.

10. The method of claim 1, further comprising placing workloads in the system after a placement model is trained.

11. A non-transitory storage medium having stored therein instructions that are executable by one or more hardware processors to perform operations comprising:

obtaining performance observations from nodes operating in a computing system, wherein each of the nodes corresponds to a state in a reinforcement learning training environment;

determining, by a restricted Boltzmann machine (RBM), probabilities for each of the states based on the performance observations representing network latency, GCU utilization, and available memory; and pruning the states during Q-table update operations by creating a superstate that represents first states in the states that are sufficiently similar to second states in the states based on a similarity radius ($\epsilon$) defined by a similarity function, wherein pruning reduces the dimensionality of the Q-table used to train a workload placement model.

12. The non-transitory storage medium of claim 11, wherein the restricted Boltzmann machine includes a hidden layer having nodes respectively corresponding to the states, the probabilities for the states being output from the hidden layer nodes.

13. The non-transitory storage medium of claim 11, wherein the nodes include virtual machines, containers, and/or physical machines, wherein the observations include metadata for each of the devices.

14. The non-transitory storage medium of claim 13, wherein the metadata includes processing cores, network lag, GPU resources, response time, and/or available memory.

15. The non-transitory storage medium of claim 11, wherein pruning states includes comparing the states in a pairwise fashion based on corresponding probabilities computed by the RBM during reinforcement learning training, wherein for each pair of states, one of the states is combined into a superstate and removed from the Q-table when a similarity function $f(s_j, s_i)$ is less than a threshold value defined by the similarity radius ($\epsilon$).

16. The non-transitory storage medium of claim 15, wherein the threshold value is 0.05.

17. The non-transitory storage medium of claim 11, further comprising defining a set of the states.

18. The non-transitory storage medium of claim 17, wherein the states are included in a Q-table and are associated with actions and/or rewards.

19. The non-transitory storage medium of claim 18, further comprising training a reinforcement learning placement model based on the reduced Q-table containing only non-pruned states remaining after pruning, wherein the model is configured to place workloads among nodes to maintain compliance with service level agreement (SLA) parameters.

20. The non-transitory storage medium of claim 11, further comprising placing workloads in the system after a placement model is trained.

* * * * *